United States Patent [19]
Caddell

[11] 4,153,941
[45] May 8, 1979

[54] TIMING CIRCUIT AND METHOD FOR CONTROLLING THE OPERATION OF CYCLICAL DEVICES

[75] Inventor: Richard W. Caddell, Brookfield, Wis.

[73] Assignee: Kearney & Trecker Corporation, West Allis, Wis.

[21] Appl. No.: 740,795

[22] Filed: Nov. 11, 1976

[51] Int. Cl.² .............................................. G06F 1/04
[52] U.S. Cl. ................................................... 364/900
[58] Field of Search ............. 444/1; 364/200 MS File, 364/900 MS File

[56] References Cited

U.S. PATENT DOCUMENTS

| | | | |
|---|---|---|---|
| 2,840,305 | 6/1958 | Williams et al. | 364/200 |
| 3,248,707 | 4/1966 | Paul et al. | 364/200 |
| 3,445,817 | 5/1969 | Criscimagna | 364/900 |
| 3,453,601 | 7/1969 | Bogert et al. | 364/200 |
| 3,564,507 | 2/1971 | Faivre et al. | 364/200 |
| 3,623,017 | 11/1971 | Lowell et al. | 364/200 |
| 3,656,123 | 4/1972 | Carnevale et al. | 364/200 |
| 3,703,707 | 11/1972 | Bovett | 364/200 |
| 3,719,931 | 3/1973 | Schroeder | 364/900 |
| 3,753,232 | 8/1973 | Sporer | 364/200 |
| 3,753,243 | 8/1973 | Ricketts, Jr. et al. | 364/200 |
| 3,809,884 | 5/1974 | Nibby et al. | 364/200 |
| 3,919,695 | 11/1975 | Gooding | 364/200 |
| 3,922,526 | 11/1975 | Cochran | 364/900 X |
| 3,939,453 | 2/1976 | Schroeder | 364/900 |
| 3,974,484 | 8/1976 | Struger et al. | 364/900 |
| 3,984,812 | 10/1976 | Dahlberg et al. | 364/200 |
| 3,995,257 | 11/1976 | Iki | 364/900 |
| 4,014,006 | 3/1977 | Sorenson et al. | 364/200 |
| 4,050,096 | 9/1977 | Bennett et al. | 364/200 |
| 4,050,097 | 9/1977 | Miu et al. | 364/200 |
| 4,060,794 | 11/1977 | Feldman et al. | 364/900 |

OTHER PUBLICATIONS

L. J. Fangmeier et al., "Processor Control by Two Independent Phase-Locked Clocks", in *IBM Tech. Discl. Bull.,* vol. 14, No. 11, Apr. 1972, pp. 3394-3395.
Pitkowsky et al., "Data Processing System Clock Control", in *IBM Tech. Disc. Bull.,* vol. 7, No. 9, Feb. 1965, pp. 754-755.

*Primary Examiner*—Melvin B. Chapnick
*Attorney, Agent, or Firm*—Cyril M. Hajewski; Donald J. Piggott

[57] ABSTRACT

An electronic data processing system which utilizes a variable timing period that is varied in accordance with the access time of the digital devices or circuits utilized in each step of the data processing program. In one embodiment, the data processing system is a computer which performs the basic arithmetic and logical operations. The computer utilizes three memories which have different access times. One memory stores instruction words specifying steps in a computer program for performing basic arithmetic and logical operations involving predetermined data words; another memory stores the data words; and, the third memory stores control words specifying the various machine operations required to execute the corresponding instruction. The three memories can be read out simultaneously, two at a time, or one at a time. In each case, the timing strobe which initiates the next step in the program is generated immediately after the slowest memory utilized in that step is ready for the next readout. Thus, the timing period in this embodiment varies in accordance with the access time of the slowest memory used in each step of the program.

19 Claims, 4 Drawing Figures

TIMING CIRCUIT AND METHOD FOR CONTROLLING THE OPERATION OF CYCLICAL DEVICES

BACKGROUND OF THE INVENTION

This invention relates to timing circuits for electronic data processing systems. In the past, the operation of electronic data processing systems such as computers, numerically controlled machine tools, and the like, have been controlled by clock circuits which generate periodic clock pulses having a fixed period. However, the use of fixed clock periods have several serious drawbacks. First, if two or more digital devices or circuits, one or both of which has an independent internal clock, are interfaced with each other, the interacting signals must be synchronized with one or both clocks. Synchronizing logic is necessary and is usually complex and expensive. Next, the synchronizing operation is time-consuming and therefore does not allow the two devices to run as fast as possible. Finally, in a digital circuit or data processing system having a fixed period clock circuit, the response time of the devices may not be in increments of the fixed clock period and this introduces inefficiency. In the program steps which are completed before the end of a fixed timing period, the computer is idle during the subsequent portion of the timing period, since the next step cannot commence until the next clock pulse is generated. Thus, a fixed timing period causes an inherent time loss in a data processing system which can be substantial when the system devices are not perfectly matched to the system clock. Also, even if the devices are perfectly matched to the clock, subsequent changes or additions to the system may upset the match and introduce inefficiency.

SUMMARY OF THE INVENTION

In accordance with this invention, the foregoing drawbacks are eliminated by utilizing a variable timing period whose length is varied in accordance with the access time of the digital devices or circuits utilized in each step of the program. Each digital device or circuit is supplied with a ready signal circuit which generates a ready signal when the device or circuit has completed one cycle of operation and is ready to commence the next cycle of operation. The ready signals are sensed during each step of the program, and a timing strobe is generated when the ready signal for the slowest circuit involved in that particular step is generated. The timing strobe initiates the next step in the program, which commences as soon as the preceding step is completed regardless of the time required for its completion. This eliminates the time loss which is inherent in systems using fixed time periods and also eliminates the need for synchronizing circuits when different digital devices or circuits having independent clocks are utilized in a common data processing system. It also enables the individual digital devices or circuits in a data processing system to be replaced with significantly faster or slower devices or circuits without requiring any changes in the other portions of the data processing system and without any loss of efficiency, such as is usually encountered when device speeds are changed in a fixed clock period system. The latter feature allows existing computers to be easily updated with faster memories as they become available without any loss of efficiency and also enables manufacturers to use the same basic computer in a variety of applicatons having markedly different speed requirements. With the timing system of this invention, fast memories and other digital devices, which are usually more expensive than slower devices, may be placed only where needed, resulting in a cost-saving. Different degrees of cost and power may be obtained by selecting the memory and input /output devices to do the job without overkill.

An additional feature of the invention is a novel method of performing data processing operations in which the instruction words, data words and control words are stored in separate memories which can be read out simultaneously to speed up operation of the system.

DESCRIPTION OF THE DRAWINGS

FIG. 3 is a block diagram of one illustrative ready circuit for use in connection with the timing circuit of FIG. 1.

DESCRIPTION OF THE INVENTION

Figure 1:
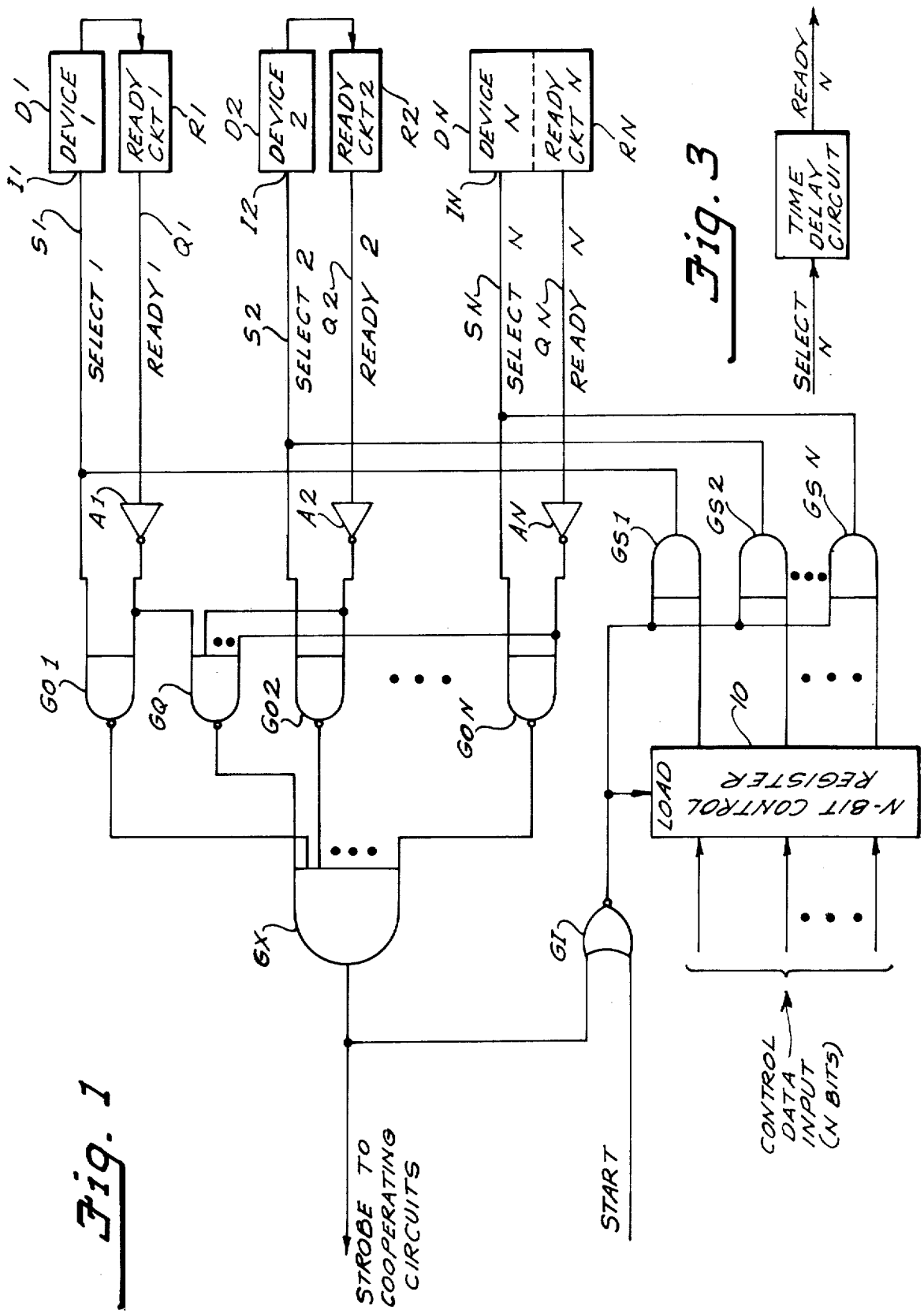
FIG. 1 is a block diagram of one embodiment of the timing circuit of this invention coupled to a plurality of digital devices.

FIG. 1 shows a block diagram of a timing circuit for generating the variable timing periods of this invention for a plurality of N different digital devices and/or circuits D1 through DN can be any suitable digital device and/or circuit that performs a single cycle of operation when actuated, for example, digital memories, input/output devices and circuits, data processing circuits, or the like. Each of the devices D1 through DN has a select or start input I1 through IN for receiving a select or start signal to actuate the device. In this particular example, the select or start signal is a binary signal which actuates the corresponding device when the select signal goes from a binary 0 to a binary 1. Most single cycle digital devices and circuits are responsive to this type of a start signal and those which are not can be easily modified to respond to such a signal.

A plurality of select conductors S1 through SN are coupled to the corresponding select inputs I1 through IN. Select signal conductors S1 through SN are also coupled to the output of corresponding NAND gates GS1 through GSN, each of which has one input coupled in parallel to a strobe generator, to be described later, and the other input coupled to a corresponding bit of an N-bit control register 10 which receives control data input signals specifying which of the devices D1 through DN are to be actuated in the corresponding program step. The control data input can be generated by reading out a control memory step-by-step in the conventional manner or by generating the appropriate signals in any other suitable digital circuit. The control memory from which the control logic is derived can constitute one of the devices D1 through DN or it can be separate.

Each of the devices D1 through DN is provided with an associated ready circuit R1 through RN which is coupled to the corresponding device D1 through DN and produces a ready output signal when the device has completed one cycle of operation and is ready to commence the next cycle of operation. Ready circuits R1 through RN can be any suitable logic circuit for generating a logical 1 signal on the corresponding ready conductors Q1 through QN when the corresponding device is ready for the next cycle of operation. Ready conductors Q1 through QN are each coupled to corresponding inverting amplifiers A1 through AN. The output of each inverting amplifier A1 through AN is coupled in parallel to one input of a corresponding output NAND gate GO1 through GON and to one input of a common NAND gate GQ. The output of the gates GO1 through GON along with the output of gate GQ are coupled to the inputs of an AND gate GX whose output constitutes the timing strobe for the circuit. The strobe output of gate GX is applied as one input to a NOR gate GI which receives an initial start pulse signal on its other input for starting the timing system on the first step of each different program. The output of NOR gate GI is applied in parallel to the load input of control register 10 and to one input of each of the select gates GS1 through GSN.

Figure 2:
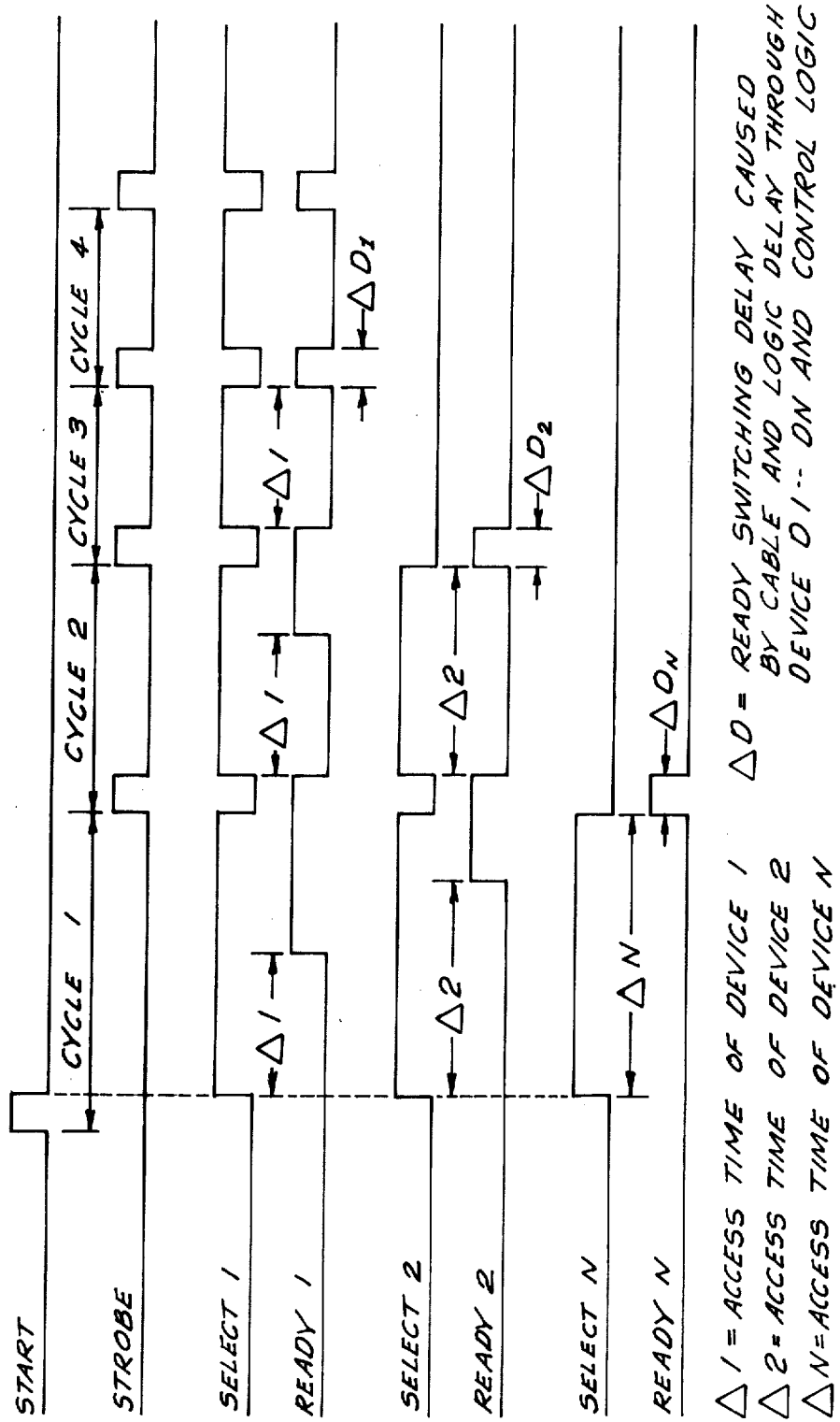
FIG. 2 is a set of waveforms illustrating four illustrative cycles of operation of the timing circuit shown in FIG. 1.

Four illustrative cycles of operation for the timing circuit of FIG. 1 are illustrated in the waveforms shown in FIG. 2 starting with the first step of the program. The first operating cycle of the timing circuit is initiated by an initial start signal which can be generated by any suitable means. The initial start signal is a pulse which goes from binary 0 to binary 1, remains at binary 1 for a period of time, and then returns to binary 0, shown on the top waveform in FIG. 2. When the initial start signal switches to a 1, this produces a binary 0 on the output of NOR gate GI since the output of strobe gate GX is initially 0. When the initial start signal drops back to binary 0, the output of NOR gate GI switches from binary 0 to binary 1 which causes the N-bit control register 10 to load control input data and apply it to the select gates GS1 through GSN which are all enabled by the binary 1 output of gate GI. The control input data has one bit for each device D1 through DN. A binary 1 in a control bit signifies that the corresponding device is to be actuated in the next program step while a binary 0 signifies that the device is to be idle. Enabling select gates GS1 through GSN produces a binary 1 on each of the select lines S1 through SN which correspond to the devices that have been selected for actuation by the control data input. The select lines for the devices which have not been selected remain at binary 0. In the example illustrated in FIG. 2, the devices D1, D2 and DN are all selected for operation in cycle 1 and therefore each of the select lines S1, S2 and SN are at binary 1 in the first cycle. In this particular example, the devices D1, D2 and DN have progressively longer access times which are specified in FIG. 2 by $\Delta 1$, $\Delta 2$ and $\Delta N$. The access time is defined as the time required for the corresponding device to complete a cycle of operation after having been actuated and to be ready to receive the next input select or start signal for the next cycle of operation. Thus, in the case of memories which have both an access time required to readout the data and a recovery time required before the next data readout can be initiated, the word "access" as used in this application includes both the readout access time of the memory and also the recovery time from a previous operation if any.

The ready circuits R1 through RN each generate a binary 1 ready signal when their corresponding device has completed its cycle of operation and is ready to start the next cycle of operation. In some cases, the ready circuits R1 through RN may be logical circuits which respond to logical conditions in the devices or circuits D1 through DN which indicate that they are ready for the next cycle of operation. The ready circuit may be separate from the corresponding digital device, as indicated in FIG. 1 by R1 and R2, or it may be an integral part of the corresponding device as indicated by RN. In the latter case, the ready signal may be generated as an inherent part of the operating cycle of the corresponding digital device. In the case of memories, the ready circuit may be a simple time delay circuit such as shown in FIG. 3 which generates a ready signal output after a fixed time delay which corresponds to the access time of the corresponding memory, i.e. the recovery time from a previous cycle if any plus the readout access time. As each of the ready signals are generated for the selected devices, the corresponding output gate GO1 through GON switches to a binary 1 output. When the last ready signal for a selected device is generated, all of the output gates GO1 through GON will have a binary 1 output as will gate GQ, whose function will be described hereinafter. Therefore, generation of the last ready signal of a selected device causes the output of AND gate GX to switch to a binary 1, thus causing the output of NOR gate GI to switch to a binary 0, which disables all of the select gates GS1 through GSN and places a binary 0 on all of the select lines S1 through SN. Except for the action of NAND gate GQ, whose output remains at a binary 1 as long as one or more of the ready signals is still at a binary 1, the disabling of gates GS1 through GSN would not cause termination of the strobe. However, the output of gate GQ switches to binary 0 when the last ready signal is terminated which switches the output of gate GX to a binary 0 and terminates the strobe. Thus, the pulse width of the strobe is determined by the time required for the ready signals for the previously actuated devices to return to binary 0 after their corresponding select line has dropped to a binary 0. Preferably this time is kept as short as possible so that the pulse width of the strobe is equal to the time delay caused by cable and logic delay through the devices D1 through DN and the control logic.

When the strobe drops from a binary 1 to a binary 0, this causes the output of NOR gate GI to go from a binary 0 to a binary 1 which loads N-bit control register 10 with the control data input for the next program step and enables the select gates GS1 through GSN to apply the new select data to devices D1 through DN. In the particular case illustrated in FIG. 2, the control data for cycle 2 calls for the actuation of devices D1 and D2 but not DN. The second cycle is similar to the first except that when the access time $\Delta 2$ of device D2 has been completed, this triggers the strobe since device D2 is the slowest in this particular step of the operation. But, since the access time $\Delta 2$ of device D2 is shorter than the access time $\Delta N$ of device DN, cycle 2 is shorter than cycle 1 by an amount equal to the difference between $\Delta N$ and $\Delta 2$. This difference represents time saved with respect to operation with a fixed timing period. When compared to a fixed timing period which is equal to $\Delta N$, cycle 2 would have the same time duration as cycle 1, even though the slowest device D2 in cycle 2 would have completed its cycle of operation before the end of the time period and the remaining time would be wasted. This saving of time is shown more dramatically in cycles 3 and 4, in which only device DN1, which is the fastest device in this particular example, is utilized. Thus, in the timing system of this invention, the amount of time alloted for each program step depends upon the actual time required for the slowest device or circuit to perform the operation required in that particular step and does not involve any waste time during which the computer circuits are waiting for the next fixed time pulse to be generated. This means that the data processing system is operating at maximum efficiency and also enables the devices D1 through DN to be replaced with much faster or slower devices without requiring any alterations in the other portions of the circuitry. In addition, it enables all of the devices D1 through DN to be interfaced in a common system without synchronizing logic even in the case that each of the devices D1 through DN has an independent internal clock. This is a significant saving since synchronizing logic can be complex and expensive. The feature of easy replacement of the devices D1 through DN with much faster or slower devices without requiring any changes in the other portions of the circuitry can be quite significant in cases where manufacturers use the same basic computer for widely varying applications since expensive fast memories can be easily replaced by less expensive slower memories in applications which do not require high speed memories.

The control data input specifying which devices are to be actuated on each step of the program can be stored in a conventional memory which can be one of the devices D1 through DN or can be separate. In the latter case, readout of the memory could be actuated by the strobe output. Alternately, the control data input could be generated by any suitable logic circuits, the only limitation being that the data for each program step should be applied to the data input conductors before the strobe initiating that step of the program is terminated.

The program can be stopped on any desired step by entering all binary zeros on the control data input conductors in that step or by disabling the select gates GS1 to GSN with appropriate logic. After the program is stopped, another start signal is required to initiate the first step of the next program.

Since the digital devices D1 through DN are actuated on the trailing edge of the strobe, it is desirable to keep the ready signal switching delay as short as possible in this particular embodiment of the invention. In the case of the time delay ready circuit shown in FIG. 3, this can be done by utilizing a time delay circuit which has a fast switch off time. Although the ready switching delay ΔD for each ready circuit is shown as being the same length in FIG. 2, it should be understood that this delay is determined in part by time delays in the corresponding device and ready circuit, and therefore, the individual ready switching delays ΔD1 through ΔDN may vary although this variation will normally be small in comparison with the variation of access time for the digital devices, Also, although the start pulse is shown in FIG. 2 as being the same length as the strobes, it could be longer or shorter without affecting the operation in any way other than lengthening or shortening the first program cycle.

The actuation circuit means for actuating devices D1 through DN include select conductors S1 through SN, select means within devices D1 through DN which actuate the corresponding device in response to signals on select conductors S1 through SN, select gates GS1 through GSN, control register 10, input gate GI, and the associated coupling means.

In the embodiment illustrated in FIGS. 1, 2 and 3, the control data for each device D1 through DN is single bit which specifies whether or not the corresponding devices is to be actuated in the corresponding program step. However, the timing system of this invention is not limited to single off-on signals but could include other instructions as well. For example, one or more of the digital devices D1 through DN may be operable in more than one mode of operation and the control data for the multi-mode devices would have to specify the mode of operation as well as the off-on instruction. This would require several control data bits for each of these devices and separate select gates for each of the additional bits. The additional select gates would be strobed in parallel with the other select gates and would couple the additional bits to the required location in the corresponding device. Additional information may also be required in the multi-mode devices. For example, one of the operations of the multi-mode device may be to mill a predetermined portion of a workpiece. In this case it may be necessary to specify the depth of the cut, which would require additional control data bits. This would require more stages in control register 10 and more gates to handle the additional bits, but would not otherwise change the circuit shown in FIG. 1.

Each of the select conductors S1 through SN defines a separate timing channel which can accommodate any number of devices whose select inputs are connected in parallel to the corresponding select conductor. The devices on one timing channel could be actuated simultaneously or in any desired combination on different program steps depending on the program.

The timing circuit of this invention can be used in connection with programs in which the devices to be actuated in each program step are specified in advance and can also be used in connection with programs in which the devices to be actuated, or their mode of operation, or some other operating parameter, depends on events which occur during the operation of the data processing system. As far as the operation of the timing circuit is concerned, it is immaterial whether the control data is determined in advance and stored in a control memory or whether it is determined by events which occur in the preceding program step. The only requirement is that the appropriate data signals be present on the control data input conductors when the select circuit is strobed.

The timing circuit shown in FIG. 1 will stop if there should be a malfunction which places all of the control data inputs at binary 0 when the select gates are strobed. Therefore, it may be desirable to place a conventional watchdog timer on the strobe output of gate GX along with circuitry to initiate malfunction procedures if a strobe is not generated within a predetermined time following the preceding strobe.

Figure 4:
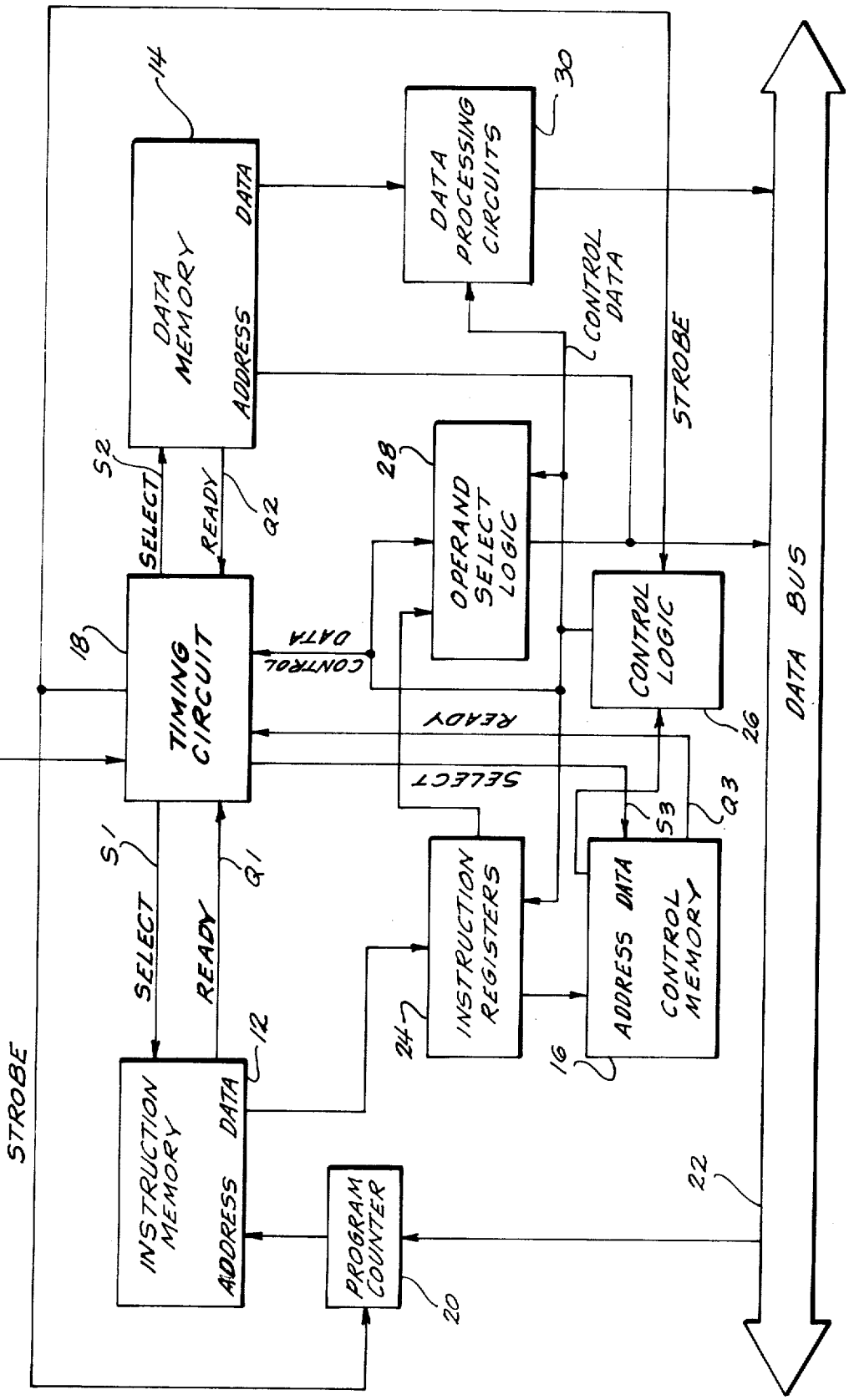
FIG. 4 is a block diagram of one illustrative data processing system utilizing the timing circuit disclosed in FIG. 1.

FIG. 4 shows the application of the above-described variable period timing system to a typical data processing circuit for performing basic arithmetic and logical operations. To take maximum advantage of the time-saving afforded by the variable timing period system of this invention, the binary data required to perform the arithmetic and logical operations is stored in three separate memories: (1) an instructions memory 12, which stores a plurality of words signifying the various operations that are to be performed pursuant to the desired data processing operation; (2) a data memory 14, which stores the data words involved in the data processing operation; and (3) a control memory 16, which contains a plurality of control words each of which specifies the individual machine operations that are necessary to carry out a corresponding instruction. Instruction memory 12, data memory 14, and control memory 16 each correspond to one of the devices D1 through DN shown in FIG. 1 and each are coupled to a timing circuit 18 by corresponding select and ready lines S1 through S3 and Q1 through Q3. Timing circuit 18 in FIG. 4 corresponds to the timing circuit shown in FIG. 1 and performs the same functions with regard to controlling the operation of the three memories. Each memory contains a readout circuit and a suitable ready circuit for generating the required ready signal after each readout. The ready circuits may be simple time delay circuits such as shown in FIG. 3.

Instruction memory 12, data memory 14, and control memory 16 can be read out simultaneously, two at a time, or one at a time. In this particular example, control memory 16 is read out on every step of the program but it is not necessary to read out instruction memory 12 and data memory 14 on every step of the program. The program is stored in instruction memory 12 and is read out in response to signals from a program counter 20 and to the select signal S1 from timing circuit 18. The program constitutes a sequence of instruction words which each specify a corresponding program step. The instruction words are stored in numerical sequence in instruction memory 12.

The select signal S1 for readout of the first instruction word is initiated by a conventional start signal applied to timing circuit 18. The data portion of the instruction word read out on the first step of the program is applied to the intruction registers 24 where it is stored in preparation for use on a subsequent step of the program. The portion of the instruction word which specified the memories to be read out on the next program step is applied to the control data input of timing circuit 18. In the first step of the program, only instruction memory 12 is read out. The first step of the program ends when the ready signal from instruction memory 12 is applied to timing circuit 18 and generates a strobe output which is applied to control logic 26 and program counter 20. Control logic 26 strobes all of the registers in the data processing and control circuits and generates the required control signals. The strobe applied to program counter 20 advances the program counter to the address of the next instruction word in the program or causes it to jump to a different instruction word. This next instruction word is read out of instruction memory 12 by the select signal S1 generated at the trailing edge of the first strobe. On the second step of the program, select signals may also be applied to data memory 14 and control memory 16 to read both memories out at the address specified in the previous instruction word stored in instruction register 24. The control word read out of control memory 16 specifies the machine functions necessary to execute the instruction stored in instruction registers 24 on the previous readout of instruction memory 12. The data word read out of data memory 14 provides data for use in connection with a corresponding data processing operation which is executed in data processing circuits 30. The results of the data processing operation are applied to data bus 22 for transmission to the other computer circuits and to associated external devices.

The timing system of this invention is not limited to any particular data processing system although for exemplary purposes it can be assumed that data processing circuits 30, control logic 26, and operand selection logic 28 are conventional computer circuits for performing the basic arithmetic and logical operations. However, data processing circuits 30, control logic 26, and operand select logic 28 can also be portions of a numerically controlled machine tool controller or any other electronic data processing system that performs multi-step data processing operations involving a predetermined plurality of data words.

In addition to the advantages noted above for the timing system of this invention, the particular data processing system shown in FIG. 4 provides additional time savings by storing the instruction words, data words, and control words in three different memories which can be read out simultaneously. This substantially speeds up the data processing system with respect to similar prior art systems and takes fullest advantage of the time saving inherent in the timing system of this invention.

In the circuit of FIG. 4, the time delay circuit which generates the ready signal for control memory 16 will normally be set to take into account the circuit delays involved in carrying out the machine functions specified by the control words stored in memory 16. When there is a significant difference in the circuit delays for different machine functions, different time delay circuits may be provided along with logic circuits for selecting the appropriate time delay circuits in accordance with the machine functions that are to be performed in any particular program step.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

1.

A method of operating any number of a plurality of devices each of which is operable when actuated to execute a cycle of operation, comprising the steps of:

(A) generating electrical control data signals signifying which devices are selected to be actuated at a given time;

(B) actuating the selected devices after said control data signals have been generated;

(C) generating an electrical ready signal for each actuated device after a cycle of operation thereof has been completed and the device is ready to commence a subsequent cycle of operation;

(D) comparing said ready signals with said control data signals in an electrical comparator circuit to determine when the last ready signal for the actuated devices has been generated;

(E) generating the leading edge of an electrical strobe after said last ready signal has been generated to signify that all of the selected devices have completed a single cycle of operation;

(F) resetting said ready signals before said strobe is terminated;

(G) generating the trailing edge of said strobe after all of said ready signals have been reset; and (H) generating further control data signals in response to the trailing edge of said strobe signifying which devices are to be operated next.

2. The method according to claim 1 wherein said control data signals from a binary word having at least one bit for each of said devices, one state of each bit signifying that the corresponding device is to be actuated and the other state of the same bit signifying that the corresponding device is not to be actuated.

3. The method according to claim 2 wherein each of said ready signals forms a binary bit, one state of said binary bit signifying that the corresponding device has completed a cycle of operation and is ready to commence a subsequent cycle of operation.

4. The method according to claim 3 wherein each control data bit is compared with the corresponding ready signal bit to determine whether or not the ready signal bit is in said state signifying completion of a cycle of operation when the corresponding control data bit is in the state signifying that the corresponding device is to be actuated.

5. The method according to claim 4 wherein each control data bit which is in the state signifying that the corresponding device is to be actuated is maintained in that state at least until the last ready signal bit for the selected devices switches to the state signifying that the corresponding device has completed a cycle of operation and is ready to commence a subsequent cycle of operation.

6. The method according to claim 1 wherein one of said devices is a first digital memory in which a plurality of binary instruction words is stored at addresses which are arranged in a predetermined program sequence and said memory including a read-out circuit and means operable to advance said read-out circuit from one step of said program sequence to the next on successive read-outs of instruction words from said memory.

7. The method according to claim 6 wherein one of said devices is a second digital memory in which a plurality of binary data words are stored at corresponding addresses, said second digital memory including a read-out circuit, and said instruction words including portions which specify the address of a data word which is to be read-out for use in the corresponding program step.

8. The method according to claim 7 wherein one of said devices is a third digital memory in which a plurality of binary control words are stored at corresponding addresses, said third memory including a read-out circuit, said instruction words including portions which specify the address of a control word which is to be read-out for use in the corresponding program step, and each control word signifying predetermined digital operations which are to be performed in pursuance of the corresponding instruction word.

9. The method according to claim 7 wherein binary words are simultaneously read-out of said first and second memories on at least one of said program steps.

10. The method according to claim 8 wherein binary words are simultaneously read-out of said first, second and third memories on at least one of said program steps.

11. The method according to claim 1 wherein said further control data signals are generated in coincidence with the trailing edge of said strobe.

12. A timing circuit for operating any number of a plurality of devices each of which is operable when actuated to execute a cycle of operation, said timing circuit comprising:

control logic means for generating control data signals specifying which devices are selected to be actuated at a given time;

actuation circuit means coupled between said control logic circuit means and said devices for actuating the selected devices;

a plurality of ready signal circuit means each associated with a corresponding device for generating a ready signal after the corresponding device has completed a cycle of operation and is ready to commence a subsequent cycle of operation;

comparison circuit means coupled to said ready signal circuit means and control logic means for comparing said ready signals to said control data signals to determine when the last ready signal for the actuated devices has been generated; and strobe generation circuit means coupled to said comparison circuit means for generating a strobe after said last ready signal for the actuated devices has been generated to signify that all of the selected devices have completed a single cycle of operation, said strobe generation circuit means including means for generating the leading edge of said strobe in response to said last ready signal, and means for generating the trailing edge of said strobe in response to the resetting of all of said ready signals.

13. The timing circuit according to claim 12 wherein said control logic circuit means generates control data signals which form a binary control word having at least one bit for each of said devices, one state of each bit signifying that the corresponding device is to be actuated and the other state signifying that the corresponding device is not to be actuated.

14. The timing circuit according to claim 13 wherein said actuation circuit means comprises:

select means associated with each device for actuating the device in response to a binary input signal; and means for gating the corresponding bit of said control word to the select input of each device to actuate the device when specified by said control word bit.

15. The timing circuit according to claim 14 wherein said actuation circuit means comprises:

a control register coupled to said control logic circuit means for receiving and storing said control word;

a plurality of AND gates each having two inputs and an output, one AND gate for each of said devices, one input of each AND gate being coupled to a corresponding stage of said control register to receive a corresponding bit of said control word, the output of each AND gate being coupled to the select input of the corresponding digital device, the other input of each AND gate being coupled to a common conductor; and start circuit means coupled to said common conductor for enabling said AND gates at predetermined times to gate said control word to the select input of said devices to actuate the selected devices.

16. The timing circuit according to claim 14 wherein each ready signal circuit means generates a binary ready signal, one state of said binary ready signal signifying that the corresponding device has completed a cycle of operation and is ready to commence a subsequent cycle of operation, and wherein said comparison circuit means comprises:

a plurality of NAND gates each having two inputs and an output, one NAND gate for each of said devices, one input of each NAND gate being coupled to the corresponding bit of said control word and the other input of each NAND gate being coupled to the corresponding ready signal, and the output of all of said NAND gates being coupled to said strobe generator circuit means.

17. The timing circuit according to claim 16 wherein said strobe generator circuit means comprises:
   an AND gate having N+1 inputs where N is the number of devices and having an output, N of said AND gate inputs being coupled respectively to the outputs of said NAND gates;
   an additional NAND gate having N inputs and an output, each input of said additional NAND gate being coupled to a corresponding one of said ready signals, and the output of said additional NAND gate being coupled to the remaining input of said AND gate; and
   the output of said AND gate comprising the output of said strobe generator circuit means.

18. The timing circuit according to claim 15 wherein said start circuit means comprises a NOR gate having two inputs and an output, the output of said NOR gate being coupled to said common conductor, one input of said NOR gate being coupled to the output of said strobe generator circuit means, and the other input of said NOR gate serving as a START input for the timing circuit.

19. The timing circuit according to claim 18 wherein said control register has a LOAD input and wherein the output of said NOR gate is coupled to said LOAD input.

* * * * *